(12) United States Patent  (10) Patent No.: US 7,975,602 B2
Herbst et al.  (45) Date of Patent: Jul. 12, 2011

(54) METHOD, SYSTEM AND APPARATUS FOR HOUSING AND DISPENSING LIQUID

(76) Inventors: Andrew F. Herbst, Copperopolis, CA (US); Jack D. Hughes, II, Fort Bragg, CA (US)

( * ) Notice: Subject to any disclaimer, the term of this patent is extended or adjusted under 35 U.S.C. 154(b) by 866 days.

(21) Appl. No.: 11/979,880

(22) Filed: Nov. 9, 2007

(65) Prior Publication Data

US 2009/0120300 A1 May 14, 2009

(51) Int. Cl.
*A47J 31/00* (2006.01)
(52) U.S. Cl. .................. 99/279; 99/285; 99/304; 99/307
(58) Field of Classification Search .................... 99/304, 99/305, 306, 307, 302 R, 279, 285; D7/307, D7/309, 515
See application file for complete search history.

(56) References Cited

U.S. PATENT DOCUMENTS

| | | | |
|---|---|---|---|
| 4,157,111 A | | 6/1979 | Tanaka et al. |
| D363,855 S | * | 11/1995 | Van Blankenburg .......... D7/515 |
| 5,784,851 A | | 7/1998 | Waugh |
| 5,964,143 A | * | 10/1999 | Driscoll et al. ................. 99/299 |
| 6,253,662 B1 | * | 7/2001 | Zelson ............................ 99/279 |
| 6,357,342 B1 | * | 3/2002 | Leung ............................ 99/279 |
| 6,722,264 B2 | * | 4/2004 | Takatsuki et al. ............... 99/288 |
| 6,739,103 B1 | | 5/2004 | Noirot |
| 7,022,270 B2 | | 4/2006 | Maybee |
| 7,146,904 B2 | * | 12/2006 | Scribner ......................... 99/300 |
| 7,252,033 B1 | * | 8/2007 | Lin ................................. 99/286 |
| D604,540 S | * | 11/2009 | Lochen .......................... D6/515 |
| 2005/0155596 A1 | * | 7/2005 | Andrews et al. ............ 126/25 R |
| 2006/0011067 A1 | * | 1/2006 | Spencer ......................... 99/307 |

FOREIGN PATENT DOCUMENTS

JP 2006-102428 A 4/2006

OTHER PUBLICATIONS

International Search Report dated Jan. 17, 2011 for corresponding PCT Application No. PCT/US2008/004578; 8 pages.
"Thick-walled Cast Pipe with Small Caliber in Centrifugal Casting", Lu Wenlong etc., Special Casting & Nonferrous Alloys, No. 5, Dec. 31, 2003; 1 page.
English Translation of Chinese Office Action issued Oct. 12, 2010 in corresponding Chinese Patent Application No. 2007800322262.4; 8 pages.

* cited by examiner

*Primary Examiner* — Reginald L Alexander
(74) *Attorney, Agent, or Firm* — Maier & Maier, PLLC (57) ABSTRACT

An apparatus and system for brewing coffee. One exemplary embodiment may include a housing formed in the shape of a helmet and having a moveable visor and an openable flap. The embodiment may also include a coffee maker disposed inside the housing and receiving ground coffee through the openable flap. Further, the embodiment can also have a coffee pot disposed inside the housing, the coffee pot receiving coffee brewed by the coffee maker and removable from the housing when the moveable visor is moved to an open position.

21 Claims, 10 Drawing Sheets

METHOD, SYSTEM AND APPARATUS FOR HOUSING AND DISPENSING LIQUID

BACKGROUND

Coffee makers have become nearly ubiquitous to many households. The standard coffee maker array of a rectangular housing with a coffee pot inside a portion of it is well known. The coffee makers typically include a pot for receiving and holding brewed coffee, as well as a heater that allows for the coffee to maintain a desired temperature. The housings, however, are predominately utilitarian and do not provide the desired functionality in all environments.

SUMMARY

An apparatus and system for brewing and removably housing a liquid. One exemplary embodiment may include a housing formed in the shape of a helmet and having a moveable visor and an openable flap. The embodiment may also include a coffee maker disposed inside the housing and receiving ground coffee through the openable flap. Further, the embodiment can also have a coffee pot disposed inside the housing and positioned on a platform or base, the coffee pot receiving coffee brewed by the coffee maker and removable from the housing when the moveable visor is moved to an open position.

Another exemplary embodiment includes a coffee dispensing device. The coffee dispensing device may include a housing having a first opening on a front portion of the housing, where the first opening may be removably covered by a visor coupled to the housing with a first hinge and a second hinge. The housing may also have a second opening on a top portion of the housing and the second opening may be removably covered by a flap coupled to the housing by a first hinge and a second hinge. The housing may also have a coffee maker disposed inside the housing and which may receive coffee grounds and water through the second opening. Further, in some exemplary embodiments, the coffee dispensing device may also have a coffee pot that may be removably disposed on a base inside the housing and beneath the coffee maker.

BRIEF DESCRIPTION OF THE FIGURES

Advantages of embodiments of the method, system and apparatus will be apparent from the following detailed description of the exemplary embodiments thereof, which description should be considered in conjunction with the accompanying drawings in which.

DETAILED DESCRIPTION

Aspects of the method, system and apparatus are disclosed in the following description and related drawings directed to specific embodiments of the method, system and apparatus. Alternate embodiments may be devised without departing from the spirit or the scope of the method, system and apparatus. Additionally, well-known elements of exemplary embodiments of the method, system and apparatus will not be described in detail or will be omitted so as not to obscure the relevant details of the method, system and apparatus. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention," "alternative embodiment(s)," and "exemplary embodiment(s)" do not require that all embodiments of the method, system and apparatus include the discussed feature, advantage or mode of operation.

Generally referring to exemplary FIGS. 1-10 a housing system, apparatus and method may be disclosed. As shown in these exemplary figures, a liquid holder and dispenser may generally be housed within a structure. The structure may be any type of structure, for example a helmet used in any of a variety of different sporting events. In one further exemplary embodiment, a beverage making and dispensing device, such as a coffee maker and coffee pot, may be housed within a structure such as a helmet.

Figure 1:
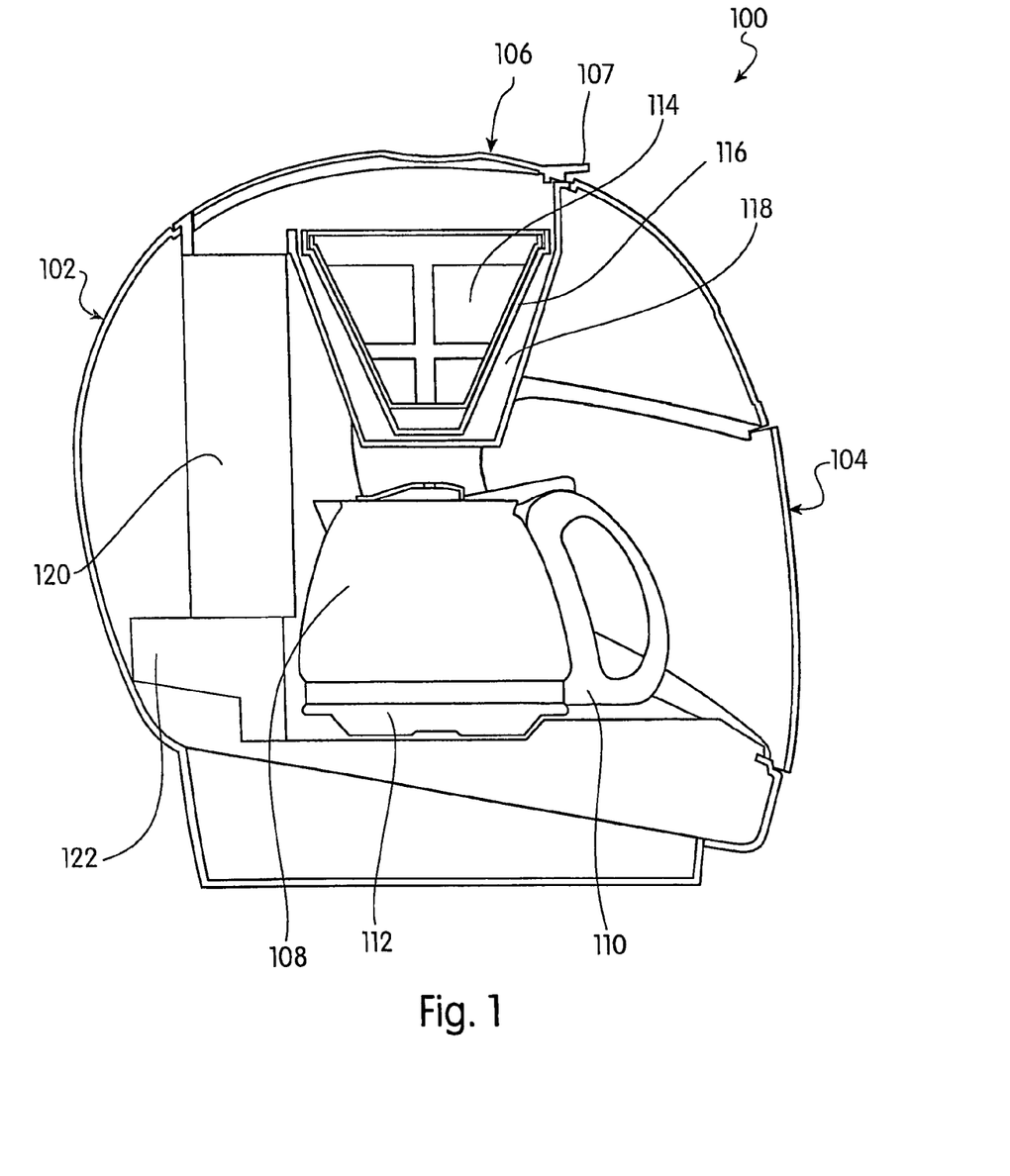
FIG. 1 is an exemplary cutaway view of a liquid housing and dispensing device.

FIG. 1 shows an exemplary cutaway view of a liquid holder and dispenser 100. Included with the holder and dispenser 100 may be housing 102. Housing 102 may be any type of housing. In some exemplary embodiments, housing 102 may be in the shape of a helmet, for example a helmet as used by an individual engaged in any of a variety of sports that require or utilize a helmet. In a further exemplary embodiment, and as shown in exemplary FIGS. 1-10, housing 102 may be a helmet such as that used for automobile racing or motorcycle riding. In other exemplary embodiments, however, any other type of helmet may be used, for example a football helmet, motocross helmet or military-style helmet. Additionally, housing 102 may be formed out of any material, for example plastic. Housing 102 may further include a visor 104. Visor 104 may be any type of visor, for example a transparent, translucent or opaque, similar to a visor on a helmet. Further, in some exemplary embodiments, visor 104 may act as a door or opening, also similar to a visor on a helmet. Thus, visor 104 may be attached via any of a variety of methods, such as one or more hinges, joints, couplings or fittings, as described in further detail below. Also, visor 104 may be moved, rotated, adjusted, displaced or otherwise relocated so as to provide an opening to an interior portion of housing 102. In some exemplary embodiments, visor 104 may be formed out of any material, for example plastic. Further, visor 104 may be separatably coupled to housing 102.

In some further exemplary embodiments, housing 102 may include flap 106. Flap 106 may be disposed on a top portion of housing 102 or at any other location of housing 102. Flap 106 may be formed out of any material, for example the same material as used to form housing 102. Additionally, flap 106 may include tab 107. Tab 107 may be disposed at a distal end of flap 106 or on a side portion of flap 106. Tab 107 may further be formed in a manner so as to provide a person with a capability of opening flap 106. For example a person may use a finger or fingers to lift or pry flap 106 open using tab 107. In other exemplary embodiments, tab 107 may be formed as a button which may be depressed to allow for the opening of flap 106. In some further exemplary embodiments, flap 106 may be coupled with housing 102 using any of a variety of methods, for example through the use of hinges, joints, couplings or fittings. Any coupling mechanism or mechanism used to couple flap 106 to housing 102 may allow for flap 106 to be opened, rotated or otherwise moved so as to allow for an opening to be formed in a portion of housing 102.

In a further exemplary embodiment, and still referring to FIG. 1, housing 102 may have a substantially hollow interior portion which may be used to house any desired article. For example, housing 102 may be used to house pot 108 as well as a coffee maker. Pot 108 may be any type of container, for example a container used to hold liquid, such as a coffee pot. Pot 108 may be formed out of any desired material, for example glass or plastic. Additionally, pot 108 may be formed with any other features, such as a removable top, a top having a removable flap, a top having a vent or any other desired features. Further, pot 108 may have handle 110 disposed on an exterior portion of pot 108, which may be used to lift or hold pot 108 and may be formed in such a manner so as to insulate a lifter or holder of pot 108 from any of the contents of pot 108 or, for example, any heat emanating from or conducted by pot 108. Further, in some exemplary embodiments, visor 104 may be moved to an upward position on housing 102 or removed from housing 102 to create an opening through which pot 108 may be removed from housing 102 and reinserted into housing 102.

Also, in some further exemplary embodiments, housing 102 may include base or platform 112. Platform 112 may be any type of platform or base, for example a platform designed to insulate housing 102 from pot 108 or a platform designed to hold, support or secure pot 108. However, in other exemplary embodiments, platform 112 may include a heating coil or any other means of generating heat, which may allow for the contents of pot 108 to be heated or warmed to a desired temperature. In still other exemplary embodiments, platform 112 may include cooling capabilities which could allow for the contents of pot 108 to be cooled to a desired temperature. In still other exemplary embodiments, platform 112 may include any known gripping device, mechanism or means, for example a gripping surface, such as rubber or any other suitable material, one or more gripping arms or one or more fasteners that may be used to hold or secure pot 108 in a desired location within housing 102.

Figure 2:
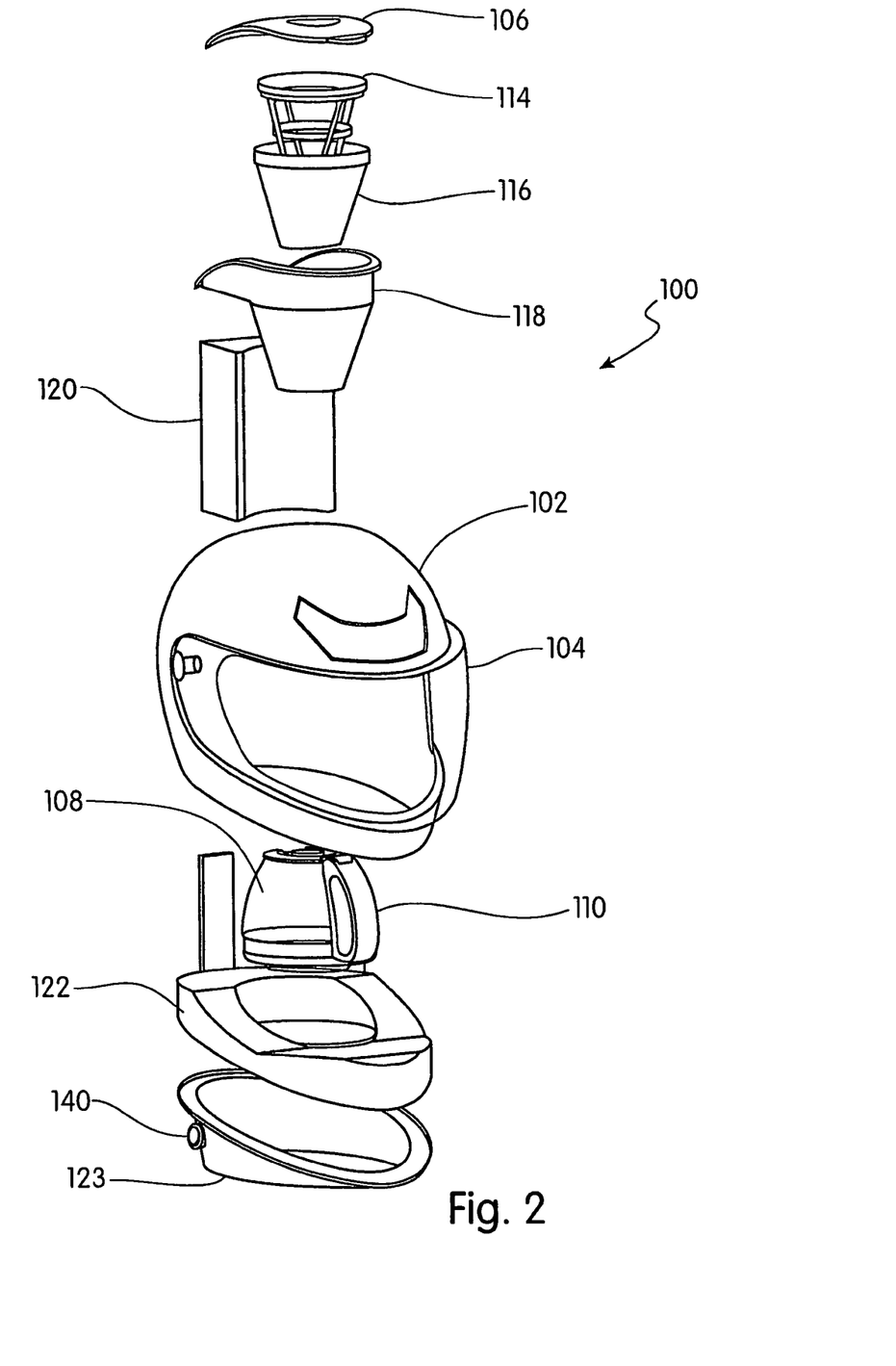
FIG. 2 is an exemplary exploded view of a liquid housing and dispensing device.

FIG. 2 shows an exemplary exploded view of liquid holding and dispensing device 100. In one exemplary embodiment, a combination of the components shown in FIG. 2 may be combined to form a coffee maker or may otherwise be used to brew coffee or some other type of beverage. Thus, components of device 100 may include filter 116, filter basket 114, outer basket 118, water (or other liquid) container 120, base 122 and base collar portion 123, as well as any other components of a coffee maker. In one exemplary embodiment, filter 116 may be coupled with filter basket 114. Filter 116 may, for example, be used to hold, support or position filter 117, which may be a disposable filter or any other type of filter. Filter 116 may be coupled with basket 118 and each of these components may be coupled or joined with container 120 inside housing 102. In some exemplary embodiments, container 120 may have a valve that may be used to transfer liquid to a heating element in base 122, and may also have an appendage or drip mechanism, for example arm 136, that may be used to move the heated contents of container 120 to filter 116 and, eventually, to pot 108. Further, the heating element may be disposed in base 122 or any other area of device 100 that may be desired, and may allow for the heating of a liquid, such as water. Also, in some exemplary embodiments, a tube or tubing 119 may be disposed in base 122 and container 120. The tubing may be coupled with the heating element described previously and may include capabilities to draw heated liquid that may have been heated by the heating element to a top portion of device 100, for example through arm 136, so as to allow heated liquid to be disposed in filter 116 and, eventually, pot 108.

In further exemplary embodiments, device 100 may also include base 122 and base collar portion 123. Base 122 may be formed out of any known material or components and may include heating or cooling capabilities so as to allow for the heating or cooling of any liquid or other material disposed in pot 108. Additionally, in some exemplary embodiments, base 122 may contain platform 112 that may act to heat or cool any of the contents of container 120 before they are sent to pot 108. Base collar portion 123 may be formed out of any material and may include a material that prevents the movement or slippage of device 100 when device 100 is disposed on a surface. Additionally, base collar portion 123 can include switch 140, which may be used to activate or deactivate any components inside housing 102, for example a coffee maker. In further exemplary embodiments, electrical cord 142 may be coupled with a plug that may be inserted into a socket to provide power to device 100 from any source, for example 110V, 220V or DC, and may exit housing 102 via an opening. Also, electrical cord 142 may include a mechanism that allows for the extraction and retraction of an electrical cord disposed within device 100.

Figure 3:
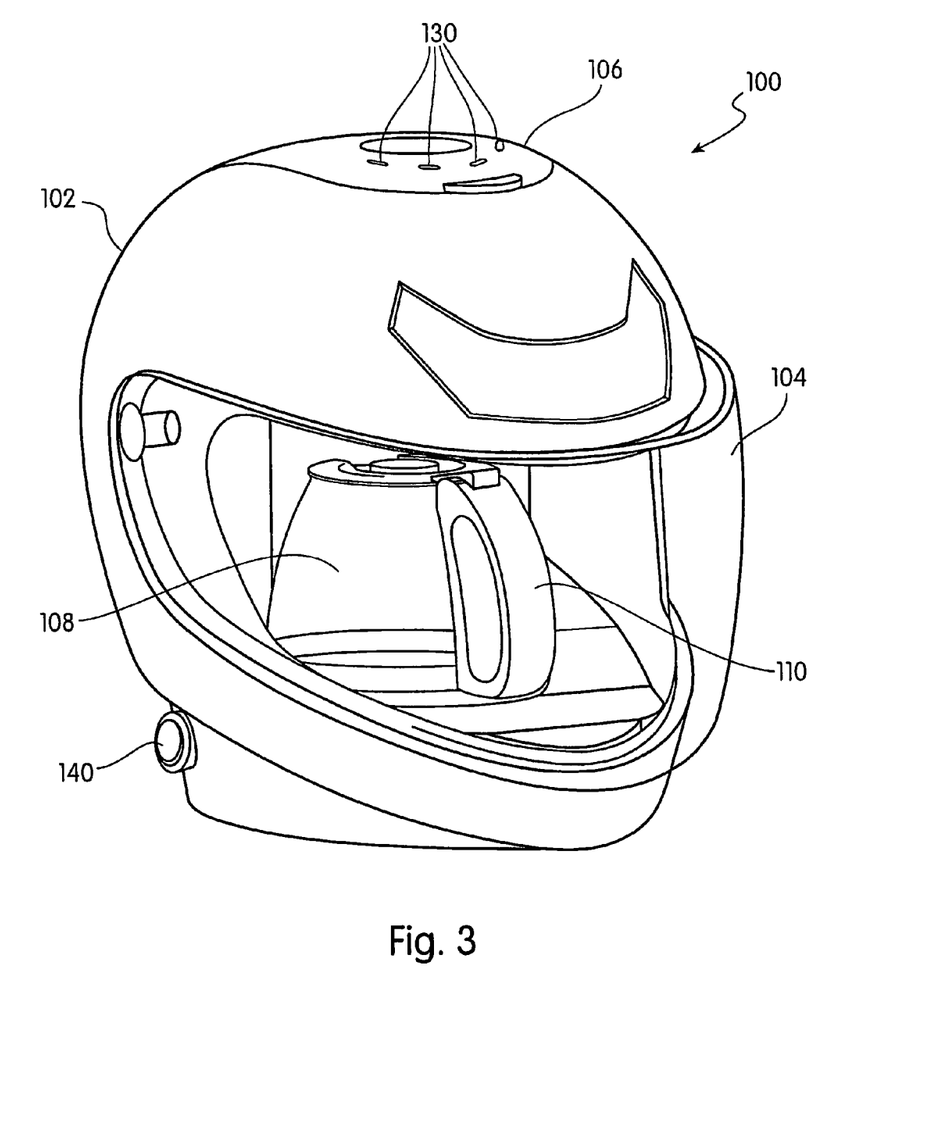
FIG. 3 is an exemplary rotated view of a liquid housing and dispensing device.
Figure 4:
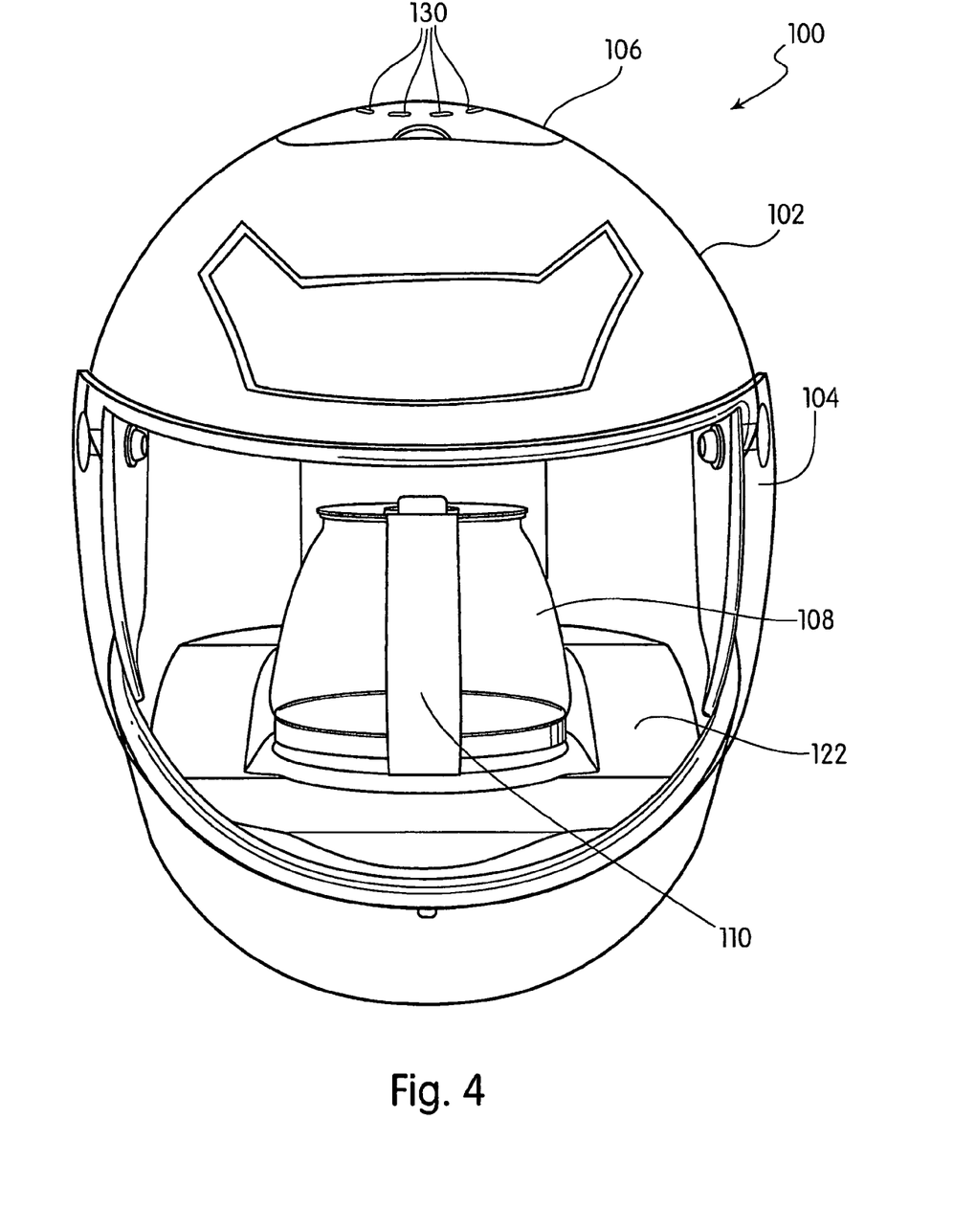
FIG. 4 is an exemplary front view of a liquid housing and dispensing device.

FIGS. 3 and 4 show exemplary rotated and front views, respectively, of device 100. In these exemplary embodiments, visor 104 is in a lowered position. Additionally, visor 104 may be made out of a clear or translucent material, which may allow for pot 108 to be seen through visor 104. Further, visor 104 may be positioned in an open position, which may allow for the extraction of pot 108 from platform 112 in device 100. Additionally, in this embodiment, flap 106 may be designed so as to be any size and may contain vent holes 130.

Figure 5:
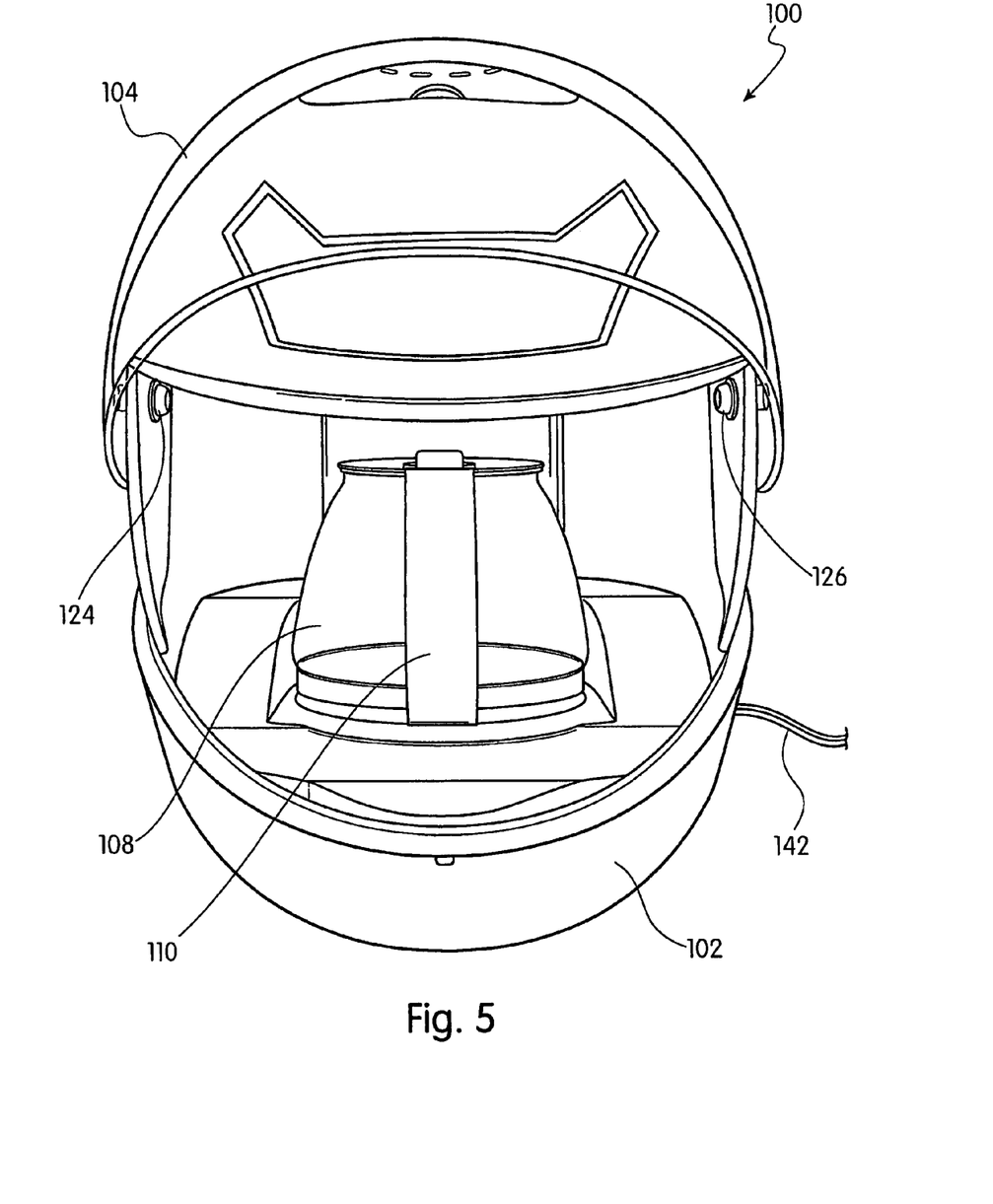
FIG. 5 is another exemplary front view of a liquid housing and dispensing device.

FIG. 5 shows an exemplary view of device 100 where visor 104 is in an open position. In this exemplary embodiment, visor 104 may again be made out of a clear or translucent material. Additionally, visor 104 may be attached to housing 102 through the use of coupling members 124 and 126. Coupling members 124 and 126 may be any type of coupling members and may allow for the raising and lowering of visor 104 on housing 102. Further, as shown in FIG. 5, visor 104 may be raised to such a position as to allow pot 108 to be extracted from housing 102 using handle 110 or any other portion of pot 108 without interfering with or contacting any other components of housing 102. Additionally, after pot 108 is used, it may be reinserted into housing 102 and, if desired, visor 104 may be lowered, similar to the embodiments shown with respect to FIGS. 3 and 4. In yet another exemplary embodiment, cord 142 may exit base collar 123 through notch 141.

Figure 6:
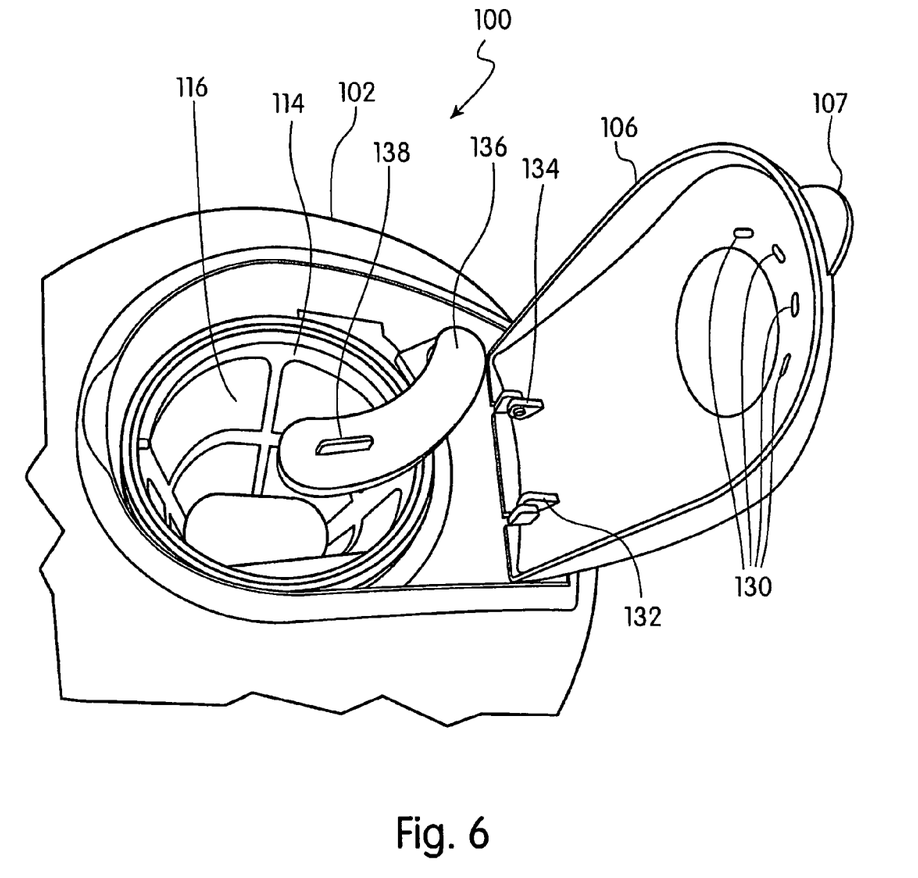
FIG. 6 is an exemplary top-down view of a liquid housing and dispensing device.

FIG. 6 shows an exemplary view of a top portion of device 100. In this embodiment, flap 106 may be disposed on a top portion of housing 102. Additionally, as shown here, flap 106 may be opened. In addition to tab 107, which may be used to assist in opening or closing flap 106, flap 106 may include holes 130. Holes 130 may be formed in any manner known to one having ordinary skill in the art and may allow for ventilation or cooling of the contents of housing 102. Also, flap 106 may be secured to housing 102 through the use of hinges or coupling members 132 and 134. Coupling members 132 and 134 may be any members that allow for the opening and closing of flap 106. In a further exemplary embodiment, arm 136 may be disposed beneath flap 106 and may be coupled with container 120, housing 102 or any of basket filter 114, filter 116 or outer basket 118 through the use of a tube or tubing 119 that may run through arm 136 and container 120 or to base 122 or any other part of device 100. Arm 136 may be used to provide water or some other liquid, for example, to brew coffee for pot 108. Arm 136 may further be rotatably attached to another component of housing 102, such as outer basket 118 or container 120, which may allow for the movement of arm 136 away from a center portion of housing 102. In some exemplary embodiments, arm 136 may be rotated so as to allow for the removal of any component inside housing 102, such as basket filter 114, filter 116 or outer basket 118. Also, arm 136 may include tab 138 which may be used to assist in the movement or removal of arm 136 and any other components, such as a tube or tubing 119, found therein.

Figure 7:
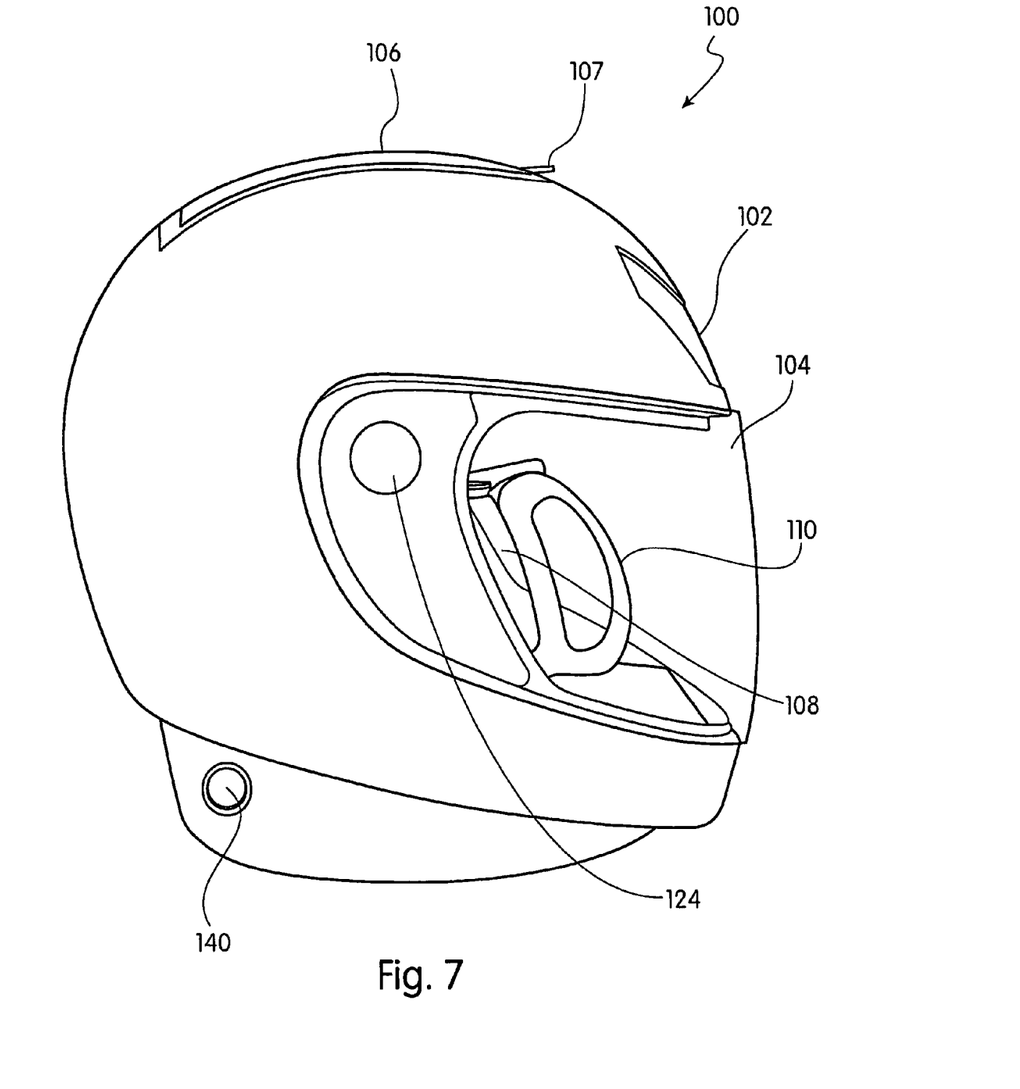
FIG. 7 is an exemplary left side view of a liquid housing and dispensing device.
Figure 8:
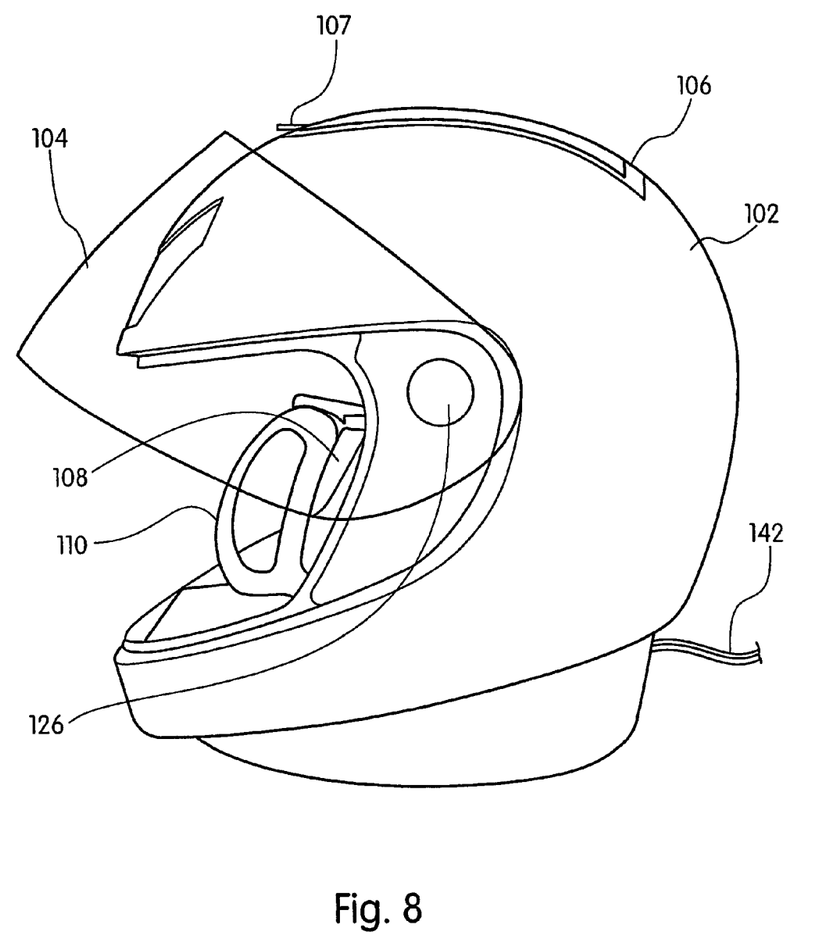
FIG. 8 is an exemplary right side view of a liquid housing and dispensing device.
Figure 9:
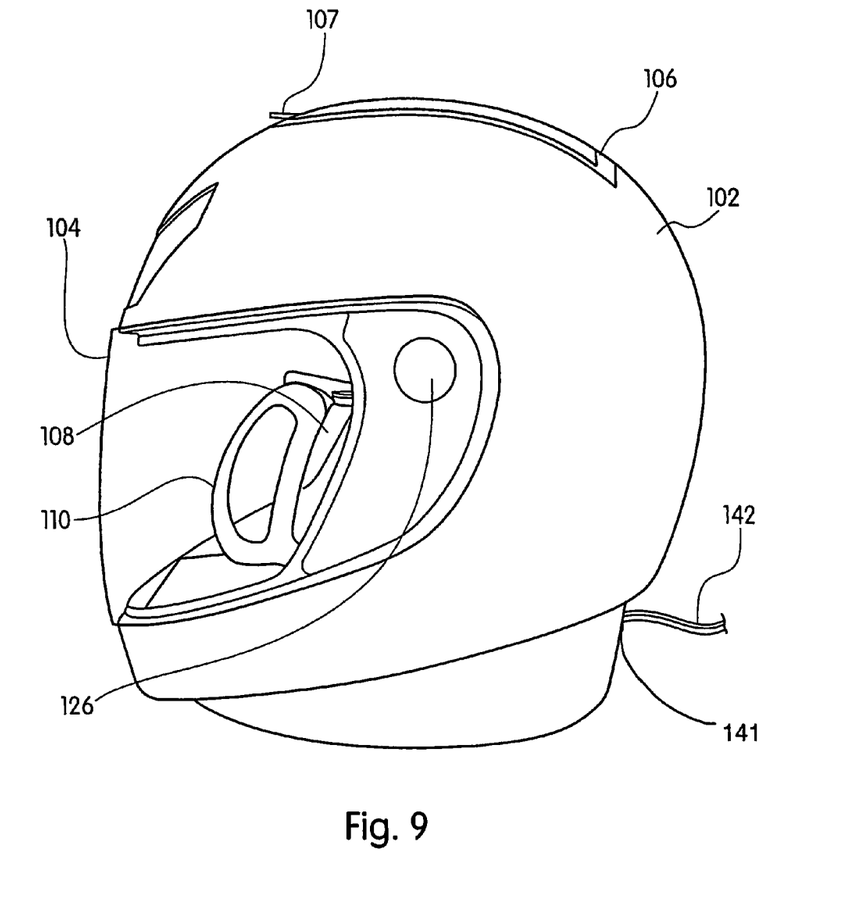
FIG. 9 is another exemplary right side view of a liquid housing and dispensing device.
Figure 10:
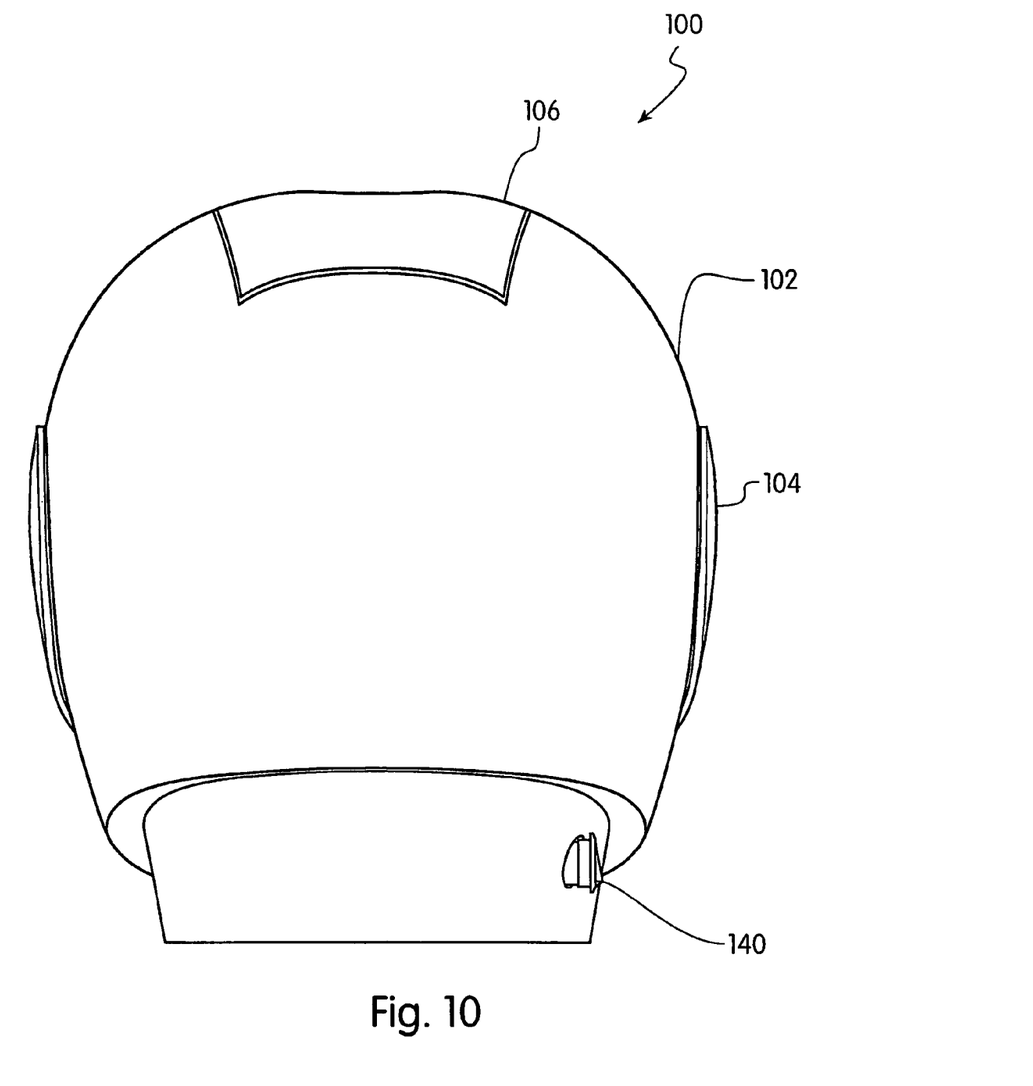
FIG. 10 is an exemplary rear view of a liquid housing and dispensing device.

FIGS. 7-9 show exemplary profile views of device 100, and FIG. 10 shows an exemplary rear view of device 100. From these views, coupling members 124 and 126 may be seen on either side of housing 102. Coupling members 124 and 126 may act to couple visor 104 with housing 102 and may allow for the raising and lowering of visor 104 on housing 102. Further, with respect to FIGS. 8 and 9, electrical cord 142 may be shown as extending through notch 141.

Generally referring back to FIGS. 1-10, device 100 may be used to brew and store coffee. In one exemplary embodiment, water may be added to container 120 by any known means after flap 106 is opened. Further, coffee grounds or, in some exemplary embodiments where device 100 incorporates or includes a coffee grinder, coffee beans may be added to the coffee maker disposed inside housing 102. The coffee maker may brew coffee which may drip into or be poured into pot 108. Pot 108, and the coffee or other beverage contained therein, may be removed from platform 112 in housing 102 at any time after visor 104 is moved or lifted into an open position. Additionally, in some exemplary embodiments, visor 104 may be removed entirely, allowing continuous or open access to pot 108.

Still other exemplary embodiments may have one or more central processing units (CPUs) that may be capable of automatically brewing coffee or assist in the brewing of coffee at a predetermined time or brewing or maintaining coffee at a desired temperature. Also, some exemplary embodiments may include a display mounted on or inside housing 102 which may display any desired data, for example the time. Further, any type of clock, timer or alarm may be included with or in housing 102. Additionally housing 102 may have any desired number of switches or buttons disposed in any desired location and may be used to control any aspect of device 100.

The foregoing description and accompanying drawings illustrate the principles, preferred embodiments and modes of operation of the method, system and apparatus described herein. However, the method, system and apparatus should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the method, system and apparatus as defined by the following claims.

What is claimed is:

1. An apparatus for brewing coffee, comprising:
    a housing formed in the shape of a helmet, the housing further having a hingedly moveable visor on a front portion, wherein the visor rotates upwardly and downwardly to an open and closed position, and an openable flap on a top portion;
    a coffee maker disposed inside the housing and receiving ground coffee through the openable flap;
    a platform disposed inside the housing; and
    a coffee pot with a handle disposed on the outside of the pot, the pot and handle disposed completely inside the housing on the platform, the coffee pot receiving coffee brewed by the coffee maker and removable from the housing when the hingedly moveable visor is moved to an open position.
2. The apparatus of claim 1, further comprising:
    at least one ventilation hole disposed on the openable flap.
3. The apparatus of claim 1, wherein the housing is formed in the shape of an automobile racing helmet.
4. The apparatus of claim 1, wherein the housing is formed in the shape of a motorcycle helmet.
5. The apparatus of claim 1, wherein the housing is formed in the shape of a football helmet.
6. The apparatus of claim 1, wherein the housing is formed in the shape of a protective helmet.
7. The apparatus of claim 1, further comprising a heating element disposed in the platform disposed in the housing.
8. The apparatus of claim 1, further comprising:
    a coffee grinder disposed inside the housing.
9. A coffee dispensing device, comprising:
    a housing having a first opening on a front portion of the housing, the first opening removably covered by a visor coupled to the housing with a first hinge and a second hinge disposed on an upper portion of the visor, wherein the visor rotates upwardly and downwardly to an open and closed position, a second opening on a top portion of the housing, the second opening removably covered by a flap coupled to the housing by a first hinge and a second hinge;
    a coffee maker disposed inside the housing, the coffee maker receiving coffee grounds and water through the second opening; and
    a coffee pot and handle removably disposed on a base completely inside the housing and beneath the coffee maker, wherein the coffee pot receives coffee from the coffee maker and is removable through the first opening.
10. The coffee dispensing device of claim 9, wherein the visor is substantially transparent.
11. The coffee dispensing device of claim 9, wherein the flap is substantially opaque.
12. The coffee dispensing device of claim 9, wherein the housing is formed in the shape of an automobile racing helmet.
13. The coffee dispensing device of claim 9, wherein the housing is formed in the shape of a motorcycle helmet.
14. The coffee dispensing device of claim 9, wherein the housing is formed in the shape of a protective helmet.
15. The coffee dispensing device of claim 9, wherein the housing is formed in the shape of a football helmet.
16. The coffee dispensing device of claim 15, wherein the visor further comprises football helmet facemask.

17. The coffee dispensing device of claim 9, further comprising:

a heating element disposed in the base inside the housing.

18. The coffee dispensing device of claim 17, wherein the heating element heats the coffee in the coffee pot after the coffee is received from the coffee maker.

19. The coffee dispensing device of claim 9, wherein the base inside the housing includes a gripping mechanism that secures the coffee pot while the coffee pot is disposed inside the housing.

20. The coffee dispensing device of claim 19, wherein the gripping mechanism is a composite material.

21. The coffee dispensing device of claim 19, wherein the gripping mechanism is a fastener.

* * * * *